2,900,374

ALUMINUM HALIDE CATALYSIS OF ETHYLENE POLYMERIZATION

Robert S. Aries, New York, N.Y.

No Drawing. Application November 15, 1956
Serial No. 622,277

14 Claims. (Cl. 260—94.9)

The present invention relates to a new and useful catalyst for the polymerization of ethylene which leads to highly crystalline, linear high density polyethylene of high melting and softening points.

Although aluminum chloride has long been known as a catalyst for the polymerization of ethylene, the polymers so obtained are not the solid polyethylenes which are of commercial interest, but rather are liquid materials or waxes ("Polyethylene" by Raff and Allison, 1956, p. 59).

I have found that a catalyst system based on an aluminum halide can be used to polymerize ethylene to high molecular weight linear crystalline polyethylene of high density, high melting point and high softening point. While aluminum halides by themselves are ineffective as catalysts to polymerize ethylene to high molecular weight linear crystalline polyethylene of high density, aluminum halides and a minor amount of vanadium or titanium activator when complexed with certain organotin or organolead compounds yield an extremely effective catalyst to promote the polymerization of ethylene to such high molecular weight polyethylenes.

Representative materials employed in the practice of the invention include aluminum chloride, aluminum bromide, and mixtures thereof. The activator, e.g., vanadium, titanium or mixtures thereof, is present in an amount ranging from about 0.00025 mol to about 0.0067 mol per mol of aluminum halide, i.e., one per 4,000 to one per 150. The preferred maximum molar proportion of activator is 0.0055. Smaller amounts exert an insignificant activating effect and larger amounts are also undesirable.

The vanadium or titanium activator may be added as a halide or an oxyhalide to the aluminum halide. Alternatively, the aluminum chloride or aluminum bromide can be prepared from metallic aluminum, and small amounts of vanadium pentoxide can be added to the aluminum turnings or powder. Upon halogenation by chlorine or bromine the resultant anhydrous vanadized aluminum halide will be effective as a catalyst for the process of the present invention. Similarly if small amounts of titanium tetrachloride are added to the aluminum powder or turnings which are then subjected to halogenation by chlorine or bromine the resultant anhydrous titanized aluminum halide will also be a catalyst for the process of the present invention.

The mixtures of aluminum halide and activator are complexed in inert solvents such as aliphatic, cycloaliphatic or aromatic hydrocarbons with tetravalent lead and tin hydrocarbon compounds whether aliphatic, aromatic, or mixed, e.g., tetraethyl lead, tetraphenyl tin, tetramethyl tin, tetraphenyl lead, and the like. The metal hydrocarbon compound can range from about 0.067 to 0.20, i.e., one-fifteenth to one-fifth the molar amount of the aluminum halide. While it can be higher, the preferred minimum is 0.1.

The lead and tin molecules as employed herein are tetravalent with all four valences preferably taken up by hydrocarbon radicals. It is possible to employ organometal compounds of tin and lead wherein only three of the valences are attached to hydrocarbon radicals while the fourth valence is attached to a halogen atom, e.g., triphenyl tin chloride, and these are equally as effective on a molar basis as the tetraorgano compounds. However, dihalogen compounds such as diphenyl tin dichloride are ineffective in the novel catalyst systems. This is surprising since the various tin phenyl chlorides are known to disproportionate so that one would have expected some of the active tri- and tetra-organo compounds to have been formed. Apparently, however, the temperatures at which the catalysts are used are insufficient to effect disproportionation to an appreciable degree.

Following preparation of the catalyst, ethylene can be bubbled in and the polymerization will proceed. This can be effected at room temperature or lower, although preferably elevated temperatures are preferred. The purity of the ethylene used is important and thoroughly dried, de-oxygenated ethylene, completely free from acetylene and as free as possible from higher boiling impurities gives the highest yields. In all the examples hereinafter set forth the ethylene used was of the highest purity, free from moisture, oxygen, acetylene and hydrocarbons other than ethylene.

The purity of the solvent system is also of importance. The reaction may be carried out in inert solvents such as heptane, octane, cyclohexane, benzene, etc., but these solvents should be highly purified to give maximum yields of high molecular weight polyethylene. In the following examples, the best commercially available inert solvents of the proper type were extensively washed with sulfuric acid, preferably at as high a temperature as convenient, followed by water washing to remove all detectable traces of acid, then dehydrated by distillation and removal of all distillate containing any moisture, then refluxed over sodium and finally distilled from the sodium, rejecting a small forerun to remove any traces of lower boiling material, leaving a liquid residue in the distilling flask to hold back heavier components. The distillate was collected in dry receivers containing pieces of metallic sodium under a blanket of dry, oxygen-free nitrogen. Although less rigorously purified solvents also gave in many cases high yields of polyethylene, the results were less fully reproducible with less highly purified solvents.

In a typical experiment the desired amounts of aluminum chloride or bromide and the vanadium or titanium compound were dissolved or dispersed in the solvent, for example, cyclohexane, the organotin compound was added, all without access of air or moisture, and the ethylene was bubbled in at a predetermined temperature with powerful stirring. With less adequate stirring the product tended to lump on the reactor wall and on the agitator shaft, and with more powerful stirring the product was more granular and adhered less to the reactor wall and agitator shaft. At the end of the reaction, methanol or isopropanol was added to the reaction mixture to decompose the catalyst, and the resultant slurry was filtered on a buchner funnel, washed with methanolic hydrogen chloride to dissolve out inorganic ash-forming compounds, then with methanol until the filtrate was free of chlorides and finally dried in vacuum at 50° C. In all the experiments carried out in this fashion the ash content of the polymer was 0.01% or less.

The following examples illustrate the preparation of the novel catalysts and their use in the polymerization of ethylene:

Example 1

To a one liter flask provided with a mercury-sealed stirrer, an ethylene gas inlet, and a vent gas outlet and blanketed with nitrogen was added 500 ml. of purified cyclohexane containing 1.33 grams (10 millimoles) of sublimed anhydrous aluminum chloride and 2.7 milligrams of vanadium (9.7 milligrams of vanadium tribromide). The solution was agitated and then 0.427 gram (1 millimole) of tetraphenyl tin was added and the solution was stirred for one hour. The solution was then warmed to 60° C. and ethylene bubbled in at ordinary pressure. There seemed to be immediate absorption as shown by observing a bubble counter set before the apparatus and one placed to receive the vent gases. The temperature rose during the reaction and it was necessary to remove the heating bath to hold down the temperature. The reaction became slower after 8 hours but had not completely ceased. 200 ml. of methanol were added, the contents of the flask were stirred for several minutes with cooling, and the cooled slurry was filtered on a buchner funnel, then washed with three 100 ml. portions of methanolic hydrogen chloride, then repeatedly with pure methanol until the filtrate was free from chlorides and the product was dried in vacuum at 50° C. overnight. The yield was 34 grams of a white powder. The ash content was less than 0.01%. The density of the product was 0.946. Tensile strength at 20° C. was above 3500 p.s.i., elongation at 20° C., 100%, at 60° C., 500%. Examination by the infrared spectrometer showed absence of methyl groups indicating that the product is a linear polymer.

Example 2

This was run exactly like Example 1 except that 2.7 milligrams of titanium (5.1 milligrams of titanium tetrachloride prepared as a standard solution of titanium tetrachloride in cyclohexane) were added instead of 2.7 milligrams of vanadium. The course of the reaction and the purification was quite similar to that of Example 1, and the product was 32 grams of a slightly yellowish powder with an ash content of less than 0.01%. The density of the product was 0.944 and the physical properties of the polymer were quite similar to those of the product of Example 1. Examination by the infrared spectrometer showed absence of methyl groups indicating that the product is a linear polymer.

Example 3

This was run exactly like Example 1, except that the spectroscopically vanadium-free and titanium-free aluminum chloride received no addition of vanadium or titanium compounds. Ethylene was bubbled through the "catalyst" solution. There was no evidence of polymerization.

Example 4

This was run exactly like Example 1, except that 2.67 grams (10 millimoles) of pure anhydrous aluminum bromide were used instead of 1.33 grams of anhydrous aluminum chloride. The course of the reaction was very similar to that in Example 1 and an analogous purification was carried out. The yield was 32 grams of white granular polyethylene with an ash content of less than 0.01%, a density of 0.943 and with physical properties substantially identical with those of the product of Example 1.

Example 5

This was run exactly like Example 1, except that purified thiophene-free benzene was used as the solvent. By vigorous stirring the aluminum chloride and the added vanadium bromide were finely suspended, and the subsequent course of the procedure was similar to that of Example 1. The product was 29 grams of a white powder with an ash content of less than 0.01%, a density of 0.944 and with physical properties substantially identical with those of the product of Example 1.

Example 6

This was run exactly like Example 2, except that 0.385 gram (1 millimole) of triphenyl tin chloride was used instead of 0.427 gram of tetraphenyl tin. The reaction was in all respects similar to that of Examples 1 and 2, and the product was 34.5 grams of a white powder with an ash content of less than 0.01%. The density of the product was 0.947 and the physical properties were quite similar to those of the product of Examples 1 and 2.

Example 7

To a one gallon agitated stainless steel autoclave with internal heating and cooling coils which had been scrupulously cleaned and dried was added 2 liters of purified cyclohexane containing 5.32 grams (40 millimoles) of sublimed anhydrous aluminum chloride and 10.8 milligrams of vanadium (as 33.0 milligrams of vanadium trichloride). The solution was agitated and then 1.71 grams (4 millimoles) of tetraphenyl tin was added and the solution was vigorously agitated for one hour. The solution was then warmed to 70° C. and charged with ethylene to a pressure of 100 pounds per square inch gage with vigorous stirring. The pressure began to drop immediately and the temperature began to rise. The temperature was controlled as close to 70° C. as possible by cooling and was not allowed to rise about 75° C. When the pressure dropped to 10 pounds per square inch gage the autoclave was recharged with ethylene to 100 pounds per square inch gage and the repressuring was repeated whenever the pressure dropped to 10 pounds per square inch gage. A total of 10 ethylene charges were thus made in the course of 7 hours, representing a total of about 450 grams of ethylene as determined by weighing the ethylene cylinder used. At the end of 7 hours the rate of absorption had not dropped to zero but was much slower than initially, and the addition of ethylene was stopped, the charge cooled to room temperature and the excess gas vented. The catalyst was then decomposed by adding 500 ml. of methanol, the autoclave opened, and the material transferred to a buchner funnel for filtration. Part of the polymer adhered to the autoclave wall and agitator shaft and was scraped off and added to the main charge. The polymer was purified analogously to the method of Example 1 and when thoroughly purified and dried there were obtained 352 grams of white polyethylene, with an ash content of 0.015%, density 0.949, and with physical properties analogous to those of the product of Example 1.

Example 8

This was run exactly like Example 7 except that 10.8 milligrams of titanium (as 42.9 milligrams of titanium tetrachloride) were used instead of 10.8 milligrams of vanadium. The course of the reaction was practically identical with that of Example 7, and when 450 grams of ethylene had been removed from the ethylene supply cylinder the autoclave was run for an additional 15 minutes, making a total of 8 hours and 20 minutes, cooled, vented, methanol added etc. The yield was 340 grams of almost white polyethylene similar in all analytical respects to the product of Example 7.

Example 9

This was run like Example 7, except that the catalyst system was 10.64 grams of sublimed anhydrous aluminum chloride and 66 milligrams of vanadium trichloride to which were added 3.42 grams of tetraphenyl tin. This gave a catalyst concentration in the cyclohexane of twice that used in Example 7. The absorption of ethylene seemed to be somewhat slower than for Example 7, and after 8 hours only 375 grams of ethylene had been removed from the cylinder and the reaction was practically finished. This indicates a lower efficiency at higher catalyst concentrations. In Example 7 the total catalyst concentration was 22 millimoles per liter, in the present example 44 millimoles per liter. The product after purification was 302 grams of practically white polyethylene, ash content 0.017%, density 0.942, but with properties otherwise substantially similar to the product of Example 1, including the absence of methyl groups as shown by the infrared spectrometer.

Example 10

This was run like Example 7, except that the catalyst system was 2.66 grams of sublimed anhydrous aluminum chloride and 16.5 milligrams of vanadium trichloride to which were added 0.855 gram of tetraphenyl tin. This gave a catalyst concentration in the cyclohexane half that used in Example 7. The absorption of ethylene seemed somewhat slower than for Example 7 and after 8 hours only 350 grams of ethylene had been removed from the cylinder and the reaction had become negligible. This, however, is a higher efficiency per unit of catalyst used, although the total production was less. The product after purification was 297 grams of snow white polyethylene, ash content less than 0.01%, density 0.949, but with properties substantially similar to the product of Example 1, including the absence of methyl groups as shown by the infrared spectrometer.

Example 11

This was run exactly like Example 7 except that the inert solvent was purified heptane. The course of the reaction was quite similar to that of Example 7 and the yield of product and the properties of the product were substantially identical with the product obtained in Example 7.

Example 12

This was run exactly like Example 7 except that the inert solvent was purified octane. The course of the reaction was quite similar to that of Example 7 and the yield of product and the properties of the product were substantially identical with the product obtained in Example 7.

Example 13

This was run exactly like Example 12 except that the temperature of the reaction was maintained at 100° C. The total ethylene was absorbed in about 5 hours and was 400 grams. The product was purified as in Examples 7–12, and amounted to 297 grams of white polyethylene with an ash content of 0.017%, density 0.942 with properties practically the same as those of Example 1.

Example 14

This was run exactly like Example 12 except that the temperature of the reaction was maintained at 5° C. The total ethylene was absorbed in 12 hours and was 430 grams in amount. Upon purification the yield was 339 grams of pure white polyethylene with an ash content of less than 0.01%, a density of 0.951. The tensile strength at 20° C. was above 3700 p.s.i., elongation at 20° C. about 100%, and at 60° C. nearly 500%. Examination by the infrared spectrometer showed complete absence of methyl groups indicating that the polyethylene produced is a linear polymer.

Example 15

This was run exactly like Example 1 except that the 2.7 milligrams of vanadium were added as 6.4 milligrams of vanadium tetrachloride. The course of the reaction was similar to that of Example 1 with practically the same yield of polymer and of substantially the same properties as the product of Example 1.

Example 16

This was run exactly like Example 2 except that 21 milligrams of titanium tetrabromide were used as the source of titanium. The course of the reaction was similar to that of Example 2 with practically the same yield of polymer and of substantially the same properties as the product of Example 2.

Example 17

This was run exactly like Example 1 except that 5.78 milligrams of vanadyl trichloride were used as the source of vanadium. The absorption of ethylene was much slower than in Example 1 and was discontinued after 10 hours. The product was purified as in Example 1 and was 6.8 grams of a faintly yellowish powder, ash content 0.02%, density 0.939. The properties were practically the same as the properties of the product of Example 1.

Example 18

This was run exactly like Example 1 except that the tin tetraphenyl was replaced by 0.235 gram (1 millimole) of tin tetraethyl. The reaction seemed somewhat more sluggish than in the case of Example 1 and was stopped at the end of 8 hours. On refining the reaction mixture a yield of 27 grams of white polyethylene was obtained, ash content 0.013%, density 0.944, and of substantially the same properties as the product of Example 1.

Example 19

This was run exactly like Example 1 except that the tin tetraphenyl was replaced by 0.179 gram (1 millimole) of tin tetramethyl. The reaction proceeded more slowly than in the case of Example 1 and was stopped at the end of 8 hours. On refining the reaction mixture a yield of 12 grams of white polyethylene was obtained, ash content 0.02%, density 0.941 and of properties almost equal to the properties of the product of Example 1.

Example 20

To the autoclave used in Example 7 was added 2 liters of purified benzene containing 5.32 grams of sublimed anhydrous aluminum chloride and 33.0 milligrams of vanadium trichloride. The solution was agitated and then 2.06 grams (4 millimoles) of tetraphenyl lead was added and the solution was vigorously agitated for one hour, then warmed to 70° C. and charged with ethylene to a pressure of 100 pounds per square inch gage with vigorous stirring. The pressure began to drop immediately and the temperature began to rise. The temperature was controlled as close to 70° C. as possible by cooling and was not allowed to rise above 75° C. When the pressure dropped to 10 pounds per square inch gage the autoclave was recharged with ethylene to 100 pounds per square inch gage and the repressuring was repeated 6 times in the course of 8 hours and then was stopped although the reaction was not ended. The charge was allowed to cool overnight and then the excess gas was released. The charge was treated in the autoclave by forcing in 500 ml. of methanol, the autoclave opened and the material transferred to a buchner funnel and filtered to relative dryness. It was purified by washing with methanolic hydrogen chloride followed by extensive washing with methanol until the filtrate was free of chlorides. The product was then dried in vacuum overnight at 50° C. and yielded 205 grams of granular white polyethylene with an ash content of 0.012%, density 0.942 and with physical properties substantially analogous to those of Example 1.

Example 21

This was run exactly like Example 20 except that 1.294 grams (4 millimoles) of lead tetraethyl were used instead of 2.06 grams of lead tetraphenyl and the solvent was purified heptane instead of benzene. The course of the reaction was substantially similar to that of Example 20 and at the end of 8 hours 270 grams of ethylene had been transferred from the supply cylinder to the autoclave. On refining the product as in Example 20 the product obtained was 195 grams of granular white polyethylene with an ash content of less than 0.01%, density 0.944 and with physical properties substantially analogous to those of Example 1.

While the aluminum halide contains the metal activator, the latter is present in such small amounts that when computing the molar amount of organometal complexing agent it can be based either on the aluminum halide alone or on the mixture of aluminum halide and activator which will give approximately the same result. In the appended claims, accordingly, the molar proportion is sometimes based on the halide and other times on the halide and activator. This facilitates computation when the source of the aluminum halide and the activator is a commercial halide already containing both materials.

Various changes and modifications may be made without departing from the spirit and scope of the present invention and it is intended that such obvious changes and modifications be considered within the purview of the annexed claims.

What is claimed is:

1. A catalyst suitable for the polymerization of ethylene comprising the complex of an aluminum halide containing an activator selected from the group consisting of vanadium and titanium in the form of halides with a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms wherein said activator is present in an amount ranging from about 0.00025 mole to about 0.0067 mole of activator per mole of aluminum halide, and said metal compound is present in said complex in an amount ranging from about 0.067 mole to about 0.20 mole per mole of aluminum halide.

2. A catalyst as defined in claim 1, wherein the aluminum halide is aluminum chloride.

3. A catalyst as defined in claim 1, wherein the aluminum halide is aluminum bromide.

4. A catalyst as defined in claim 1, wherein the aluminum halide is a mixture of aluminum chloride and bromide.

5. A catalyst suitable for the polymerization of ethylene comprising the complex of an aluminum halide containing from about 0.00025 moles to about 0.0055 moles per mole of aluminum halide of vanadium in the form of a vanadium halide as an activator with from about 0.1 mole to about 0.20 mole per mole of aluminum halide of a hydrocarbon-substituted compound of tetravalent tin wherein at least three of the tin valences are connected to hydrocarbon radicals selected from the group consisting of alkyl and phenyl, with any remaining valences connected to halogen atoms.

6. A catalyst suitable for the polymerization of ethylene comprising the complex of an aluminum halide containing from about 0.00025 moles to about 0.0055 moles per mole of aluminum halide of vanadium in the form of a vanadium halide as an activator with from about 0.1 mole to about 0.20 mole per mole of aluminum halide of a hydrocarbon-substituted compound of tetravalent lead wherein at least three of the lead valences are connected to hydrocarbon radicals selected from the group consisting of alkyl and phenyl, with any remaining valences connected to halogen atoms.

7. A catalyst suitable for the polymerization of ethylene comprising the complex of an aluminum halide containing from about 0.00025 moles to about 0.0055 moles per mole of aluminum halide of titanium in the form of a titanium halide as an activator with from about 0.1 mole to about 0.20 mole per mole of aluminum halide of a hydrocarbon-substituted compound of tetravalent tin wherein at least three of the tin valences are connected to hydrocarbon radicals selected from the group consisting of alkyl and phenyl, with any remaining valences connected to halogen atoms.

8. A catalyst suitable for the polymerization of ethylene comprising the complex of an aluminum halide containing from about 0.00025 moles to about 0.0055 moles per mole of aluminum halide of titanium in the form of a titanium halide as an activator with from about 0.1 mole to about 0.20 mole per mole of aluminum halide of a hydrocarbon-substituted compound of tetravalent lead wherein at least three of the lead valences are connected to hydrocarbon radicals selected from the group consisting of alkyl and phenyl, with any remaining valences connected to halogen atoms.

9. A catalyst suitable for the polymerization of ethylene comprising the complex of an aluminum halide containing from about 0.00025 moles to about 0.0055 moles per mole of aluminum halide of vanadium in the form of a vanadium halide as an activator with from about 0.1 mole to about 0.20 mole per mole of aluminum halide of tetrahydrocarbon lead said hydrocarbon being selected from the group consisting of alkyl and phenyl.

10. A catalyst suitable for the polymerization of ethylene comprising the complex of an aluminum halide containing from about 0.00025 moles to about 0.0055 moles per mole of aluminum halide of vanadium in the form of a vanadium halide as an activator with from about 0.1 mole to about 0.20 mole per mole of aluminum halide of trihydrocarbon tin halide said hydrocarbon being selected from the group consisting of alkyl and phenyl.

11. A catalyst suitable for the polymerization of ethylene comprising the complex of an aluminum halide containing from about 0.00025 moles to about 0.0055 moles per mole of aluminum halide of vanadium in the form of a vanadium halide as an activator with from about 0.1 mole to about 0.20 mole per mole of aluminum halide of tetrahydrocarbon tin said hydrocarbon being selected from the group consisting of alkyl and phenyl.

12. A catalyst suitable for the polymerization of ethylene comprising the complex of aluminum chloride containing vanadium chloride as an activator in an amount ranging from about 0.00025 mole to about 0.0055 mole of vanadium chloride per mole of aluminum chloride with from about 0.1 mole to about 0.20 mole per mole of aluminum chloride of tetraphenyl tin.

13. The process for preparing a catalyst suitable for the polymerization of ethylene, which comprises contacting in an inert organic solvent an aluminum halide, an activator selected from the group consisting of vanadium and titanium in the form of halides in an amount ranging from about 0.00025 moles of about 0.0067 mole per mole of the aluminum halide, and a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms, said metal compound being present in an amount ranging from about 0.067 mole to about 0.20 mole per mole of said aluminum halide.

14. The process for polymerizing ethylene which comprises bubbling ethylene into a suspension in an inert organic solvent of a complex of an aluminum halide containing from about 0.00025 moles to about 0.0067 mole per mole of aluminum halide of an activator selected from the group consisting of vanadium and titanium in the form of halides with from about 0.067 mole to about 0.20 mole per mole of aluminum halide of a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms.

References Cited in the file of this patent

UNITED STATES PATENTS

| | | |
|---|---|---|
| 2,440,498 | Young | Apr. 27, 1948 |
| 2,786,036 | Freimiller et al. | Mar. 19, 1957 |

FOREIGN PATENTS

| | | |
|---|---|---|
| 874,215 | Germany | Apr. 20, 1953 |
| 538,782 | Belgium | Dec. 6, 1955 |
| 547,618 | Belgium | Nov. 7, 1956 |

Notice of Adverse Decision in Interference

In Interference No. 91,760 involving Patent No. 2,900,374, R. S. Aries, Aluminum halide catalysis of ethylene polymerization, final judgment adverse to the patentee was rendered Feb. 27, 1964, as to claims 5, 6, 9, 10, 11 and 12.
[*Official Gazette August 25, 1964.*]